(12) United States Patent
Park et al.

(10) Patent No.: US 12,280,668 B2
(45) Date of Patent: Apr. 22, 2025

(54) DISPLAY SUBSTRATE PREVENTING LIGHT SOURCE LIGHT FROM PASSING TO LIGHT SENSOR

(71) Applicant: GM Global Technology Operations LLC, Detroit, MI (US)

(72) Inventors: Jonglee Park, Novi, MI (US); Jodi Mary Jean Allen, Lake Orion, MI (US); Michael K. Larsen, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 31 days.

(21) Appl. No.: 18/361,394

(22) Filed: Jul. 28, 2023

(65) Prior Publication Data

US 2025/0033470 A1    Jan. 30, 2025

(51) Int. Cl.
*B60K 35/00* (2024.01)
*B60K 35/22* (2024.01)
*B60K 35/60* (2024.01)

(52) U.S. Cl.
CPC .............. *B60K 35/00* (2013.01); *B60K 35/22* (2024.01); *B60K 35/60* (2024.01); *B60K 2360/1523* (2024.01); *B60K 2360/21* (2024.01); *B60K 2360/23* (2024.01); *B60K 2360/332* (2024.01); *B60K 2360/343* (2024.01); *B60K 2360/691* (2024.01); *B60K 2360/692* (2024.01); *B60K 2360/785* (2024.01)

(58) Field of Classification Search
CPC ........ B60K 35/00; B60K 35/22; B60K 35/60; B60K 2360/1523; B60K 2360/21; B60K 2360/23; B60K 2360/332; B60K 2360/343; B60K 2360/691; B60K 2360/692; B60K 2360/785
USPC ........................................................ 348/148
See application file for complete search history.

(56) References Cited

U.S. PATENT DOCUMENTS

| | | | | |
|---|---|---|---|---|
| 8,749,529 B2* | 6/2014 | Powell | .................. | G06F 3/0412 345/173 |
| 2010/0253540 A1* | 10/2010 | Seder | ..................... | G08G 1/165 348/148 |
| 2010/0253600 A1* | 10/2010 | Seder | ..................... | B60K 35/00 345/7 |
| 2011/0273673 A1* | 11/2011 | Masalkar | ............... | G03B 21/60 353/38 |
| 2013/0135359 A1* | 5/2013 | Gally | .................... | G06F 3/0428 362/602 |
| 2013/0229357 A1* | 9/2013 | Powell | .................. | G06F 3/0412 345/173 |

(Continued)

FOREIGN PATENT DOCUMENTS

| | | |
|---|---|---|
| DE | 202018106303 U1 | 2/2020 |
| DE | 102019204841 A1 | 10/2020 |
| WO | 2022205520 A1 | 10/2022 |

*Primary Examiner* — Marnie A Matt
(74) *Attorney, Agent, or Firm* — CANTOR COLBURN LLP

(57) ABSTRACT

A vehicle includes a window having a display. The display includes a substrate, a light source disposed at a first location of the substrate, a light sensor disposed at a second location of the substrate, and a first optical medium disposed on the substrate over the light source. The first optical medium includes a surface at an angle that prevents light from the light source from passing through the first optical medium and into the light sensor.

20 Claims, 5 Drawing Sheets

(56) References Cited

U.S. PATENT DOCUMENTS

| | | | | |
|---|---|---|---|---|
| 2014/0313339 A1* | 10/2014 | Diessner | ............... | H04N 7/18 |
| | | | | 348/148 |
| 2014/0368544 A1* | 12/2014 | Kobayashi | ......... | G02B 27/0101 |
| | | | | 345/633 |
| 2017/0161540 A1* | 6/2017 | Mienko | ............... | H01L 31/0236 |
| 2017/0343856 A1* | 11/2017 | Grandclerc | ......... | B60R 11/0229 |
| 2023/0280522 A1* | 9/2023 | Park | ..................... | B60Q 1/268 |
| | | | | 362/606 |
| 2024/0135741 A1 | 4/2024 | Liu et al. | | |

* cited by examiner

DISPLAY SUBSTRATE PREVENTING LIGHT SOURCE LIGHT FROM PASSING TO LIGHT SENSOR

INTRODUCTION

The subject disclosure relates to an interactive display used in a vehicle and, in particular, to an interactive display that prevents light from a light source of the interactive display from creating interference at a light sensor of the interactive display.

An interactive display can be used at a vehicle to allow a user to interact with the vehicle. The interactive display can be disposed in a window of the vehicle and includes a light source for providing information to the user and a sensor for receiving information from the user. Light from the light source can cause light interference at the sensor, generally as a result of reflection. Accordingly, it is desirable to provide an interactive display which reduces or prevents light from the light source from causing light interference at the sensor.

SUMMARY

In one exemplary embodiment, a display is disclosed. The display includes a substrate, a light source disposed at a first location of the substrate, a light sensor disposed at a second location of the substrate, and a first optical medium disposed on the substrate over the light source. The first optical medium includes a surface at an angle that prevents light from the light source from passing through the first optical medium and into the light sensor.

In addition to one or more of the features described herein, the surface is a curved surface between the first location and the second location within a plane that is perpendicular to the substrate and includes the first location and the second location.

In addition to one or more of the features described herein, the surface is in a shape of a parabola and a focus of the parabola is located at the first location.

In addition to one or more of the features described herein, the surface is oriented such that light from the light source is incident at the surface at an angle greater than a critical angle for total internal reflection.

In addition to one or more of the features described herein, the display further includes an opening in the first optical medium above the light sensor, wherein a second optical medium fills the opening and is in contact with the first optical medium, wherein a first index of refraction of the first optical medium is greater than a second index of refraction of the second optical medium.

In addition to one or more of the features described herein, the surface is parallel to the substrate, further comprising a notch in the surface disposed at a location between the light source and an adjacent light source.

In another exemplary embodiment, a window for a vehicle is disclosed. The window includes a display. The display includes a substrate, a light source disposed at a first location of the substrate, a light sensor disposed at a second location of the substrate, and a first optical medium disposed on the substrate over the light source. The first optical medium including a surface at an angle that prevents light from the light source from passing through the first optical medium and into the light sensor.

In addition to one or more of the features described herein, the surface is a curved surface between the first location and the second location within a plane that is perpendicular to the substrate and includes the first location and the second location.

In addition to one or more of the features described herein, the surface is in a shape of a parabola and a focus of the parabola is located at the first location.

In addition to one or more of the features described herein, the surface is oriented such that light from the light source is incident at the surface at an angle greater than a critical angle for total internal reflection.

In addition to one or more of the features described herein, the first optical medium further includes an opening above the light sensor, wherein a second optical medium fills the opening and is in contact with the first optical medium, wherein a first index of refraction of the first optical medium is greater than a second index of refraction of the second optical medium.

In addition to one or more of the features described herein, the second optical medium is an optical bonding material that bonds a first pane of the window to a second pane of the window.

In addition to one or more of the features described herein, the surface is parallel to the substrate, further comprising a notch in the surface disposed at a location between the light source and an adjacent light source.

In yet another exemplary embodiment, a vehicle is disclosed. The vehicle includes a window having a display. The display includes a substrate, a light source disposed at a first location of the substrate, a light sensor disposed at a second location of the substrate, and a first optical medium disposed on the substrate over the light source. The first optical medium including a surface at an angle that prevents light from the light source from passing through the first optical medium and into the light sensor.

In addition to one or more of the features described herein, the surface is a curved surface between the first location and the second location within a plane that is perpendicular to the substrate and includes the first location and the second location.

In addition to one or more of the features described herein, the surface is in a shape of a parabola and a focus of the parabola is located at the first location.

In addition to one or more of the features described herein, the surface is oriented such that light from the light source is incident at the surface at an angle greater than a critical angle for total internal reflection.

In addition to one or more of the features described herein, the first optical medium further includes an opening above the light sensor, wherein a second optical medium fills the opening and is in contact with the first optical medium, wherein a first index of refraction of the first optical medium is greater than a second index of refraction of the second optical medium.

In addition to one or more of the features described herein, the second optical medium is an optical bonding material that bonds a first pane of the window to a second pane of the window.

In addition to one or more of the features described herein, the surface is parallel to the substrate, further comprising a notch in the surface disposed at a location between the light source and an adjacent light source.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
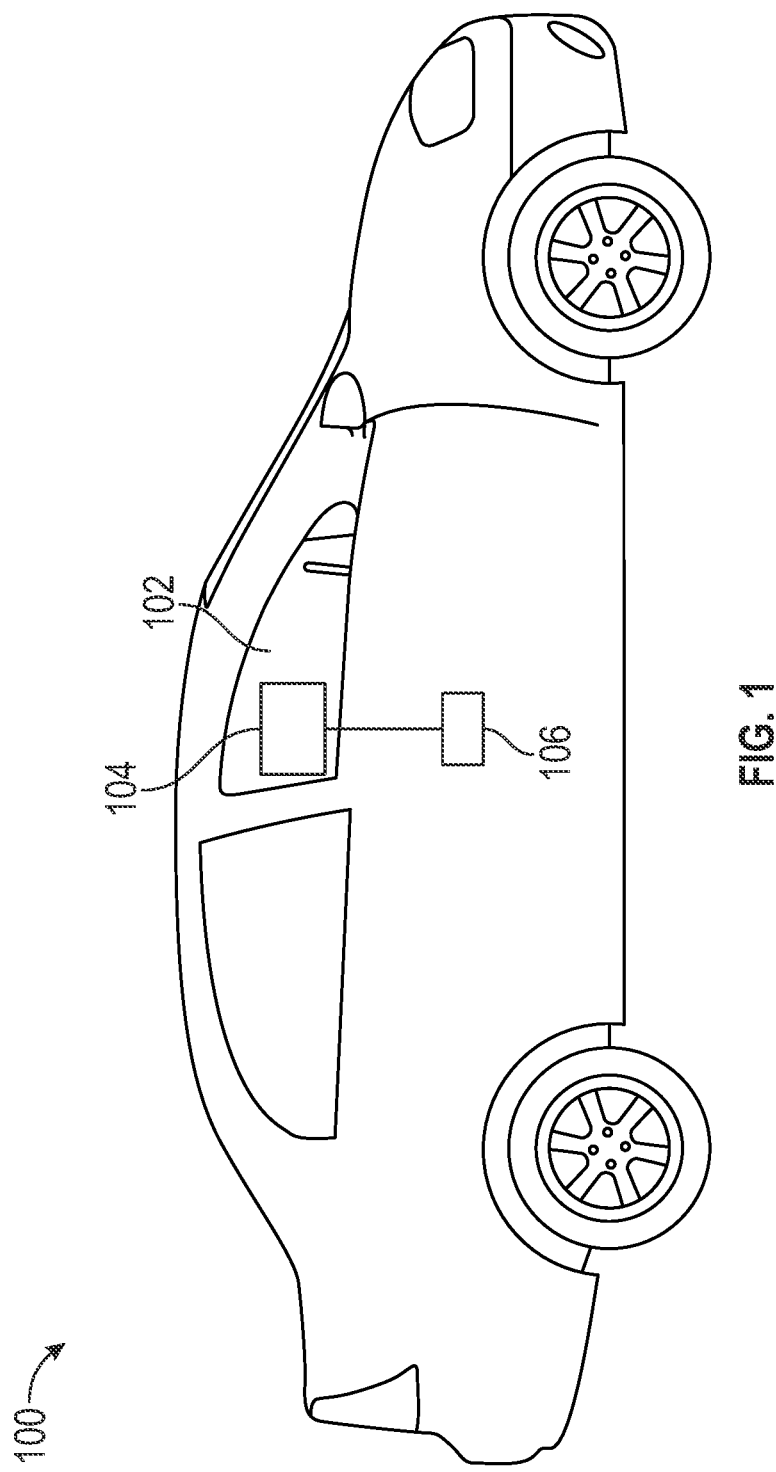
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 includes a window 102 with an interactive display 104 embedded therein. The window 102 can be any window of the vehicle 100, including a windshield, a side window, rear window, etc. In addition, the window 102 can be a glass surface of an object, such as a mirror, etc. In various embodiments, the interactive display can be disposed on an opaque surface of the vehicle 100. The interactive display 104 is coupled to a processor 106, which controls operation of the interactive display to interact with a user.

Figure 2:
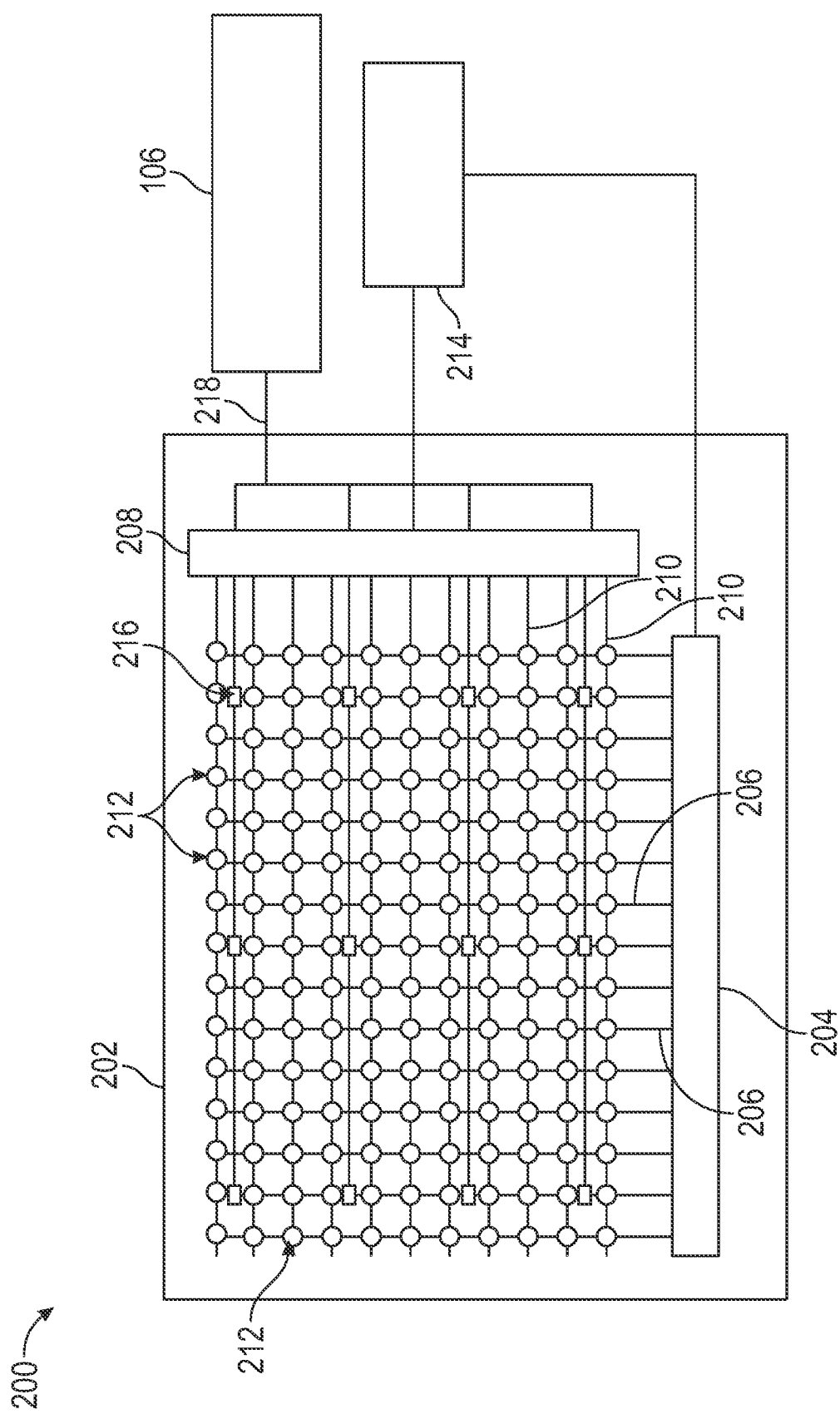
FIG. 2 shows an electrical circuit of the interactive display.

FIG. 2 shows an electrical circuit 200 of the interactive display 104. The electrical circuit 200 is formed on a substrate 202 and includes a plurality of pixels aligned in a first array. A source driver 204 provides source lines 206 that extend in a first direction (e.g., a vertical direction). A gate driver 208 provides gate lines 210 that extend in a second direction (e.g., a horizontal direction). Light sources 212 are disposed at the intersections of the source lines 206 and the gate lines 210, where a single light source (or multiple light sources) can be disposed at a single intersection. The light source 212 can includes one or more light emitting diodes (LEDs) or micro-LEDs, in various embodiments. A controller 214 controls operation of the source driver 204 and the gate driver 208 to provide signals for operating the light sources 212. A second array on the substrate 202 includes light sensors 216. A light sensor 216 can be a camera, for example. The light sensors 216 are connected to the processor 106 via a data line 218. Due to the configuration of the electrical circuit 200. Each light sensor 216 can be surrounded by a plurality of light sources 212.

Figure 3:
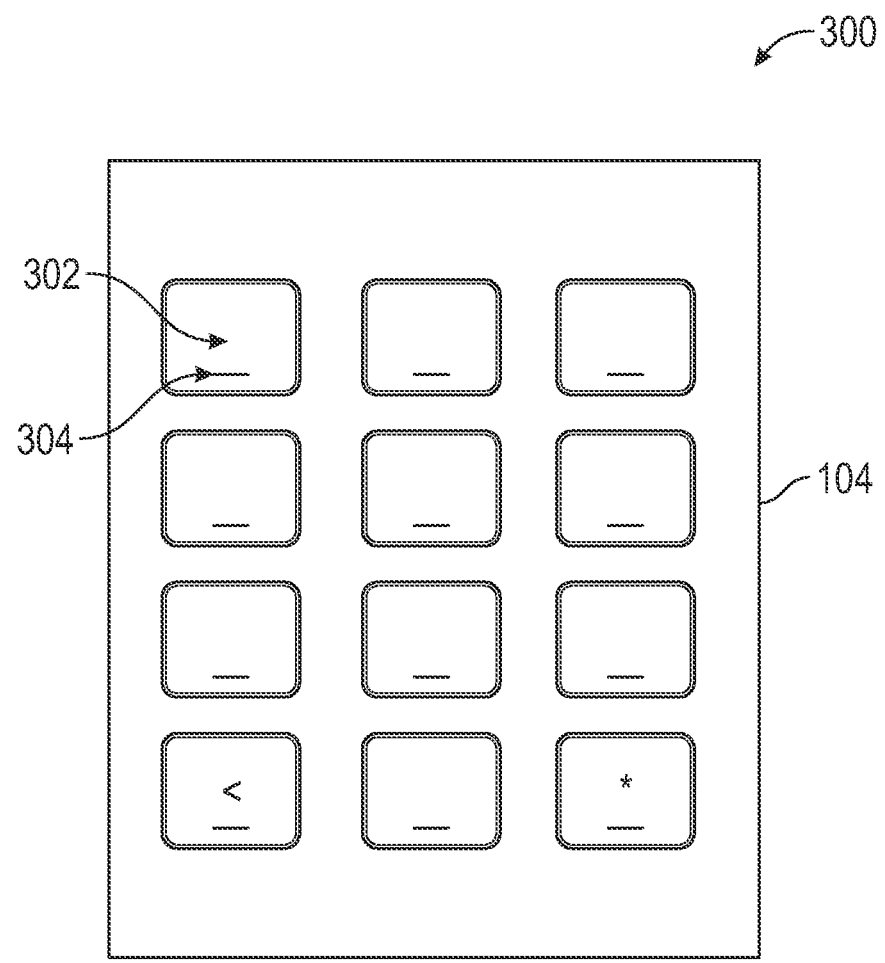
FIG. 3 shows a front view of the interactive display, in an illustrative embodiment.

FIG. 3 shows a front view 300 of the interactive display 104, in an illustrative embodiment. For the purpose of illustration, the interactive display 104 is shown as a numerical keypad. The interactive display 104 includes numbers 302 formed by the one or more light sources 212 and an input device 304 formed by one or more light sensors 216. The user reads the number (e.g., "1"), and selects the number by placing a finger over the number, thereby blocking light at the light sensor 216. This change in the intensity of light is recorded at the light sensor 216 and sent to the processor 110.

Figure 4:
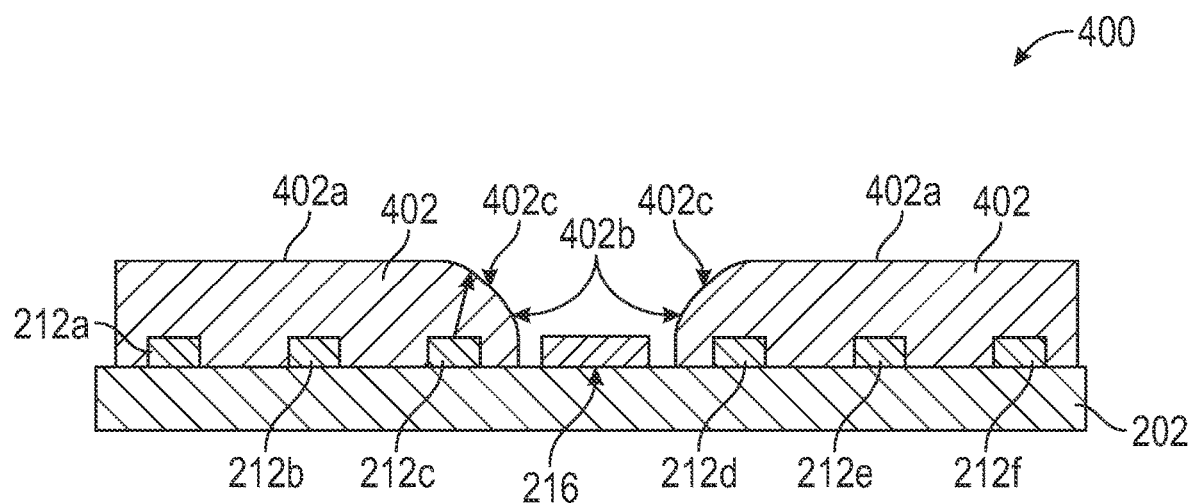
FIG. 4 shows a side cross-sectional view of the electrical circuit, in an embodiment.

FIG. 4 shows a side cross-sectional view 400 of the electrical circuit 200, in an embodiment. The side cross-sectional view 400 shows a plurality of light sources 212a-f arranged in a line. A light sensor 216 is disposed at a location between two of the light sources 212a-f. For illustrative purposes, the light sensor 216 is located between light source 212c and light source 212d. An optical medium 402 is disposed on the substrate 202. The optical medium 402 covers the light sources 212a-f having an opening that leaves the light sensor 216 exposed to the outside environment. The optical medium 402 has an index of refraction that is greater than that of the outside environment.

The optical medium 402 has a first surface 402a that lies parallel to the plane of the substrate 202 and a second surface 402b that forms the sides of the opening. The second surface 402b intersects the substrate 202 between a first location that includes and the light source 212c and a second location that includes the light sensor 216 (or alternatively between the light source 212d and the light sensor). The second surface 402b intersects the substrate 202 at about a perpendicular angle.

A transition surface 402c between first surface 402a and the second surface 402b forms a curved surface. In various embodiments, the curved surface can be in a shape of a parabola, within a plane perpendicular to the substrate 202 and including the light sources 212a-f. A parabola is defined by a focus. The focus of the parabolic surface is located at the light source 212c. With the focus of the parabolic surface at the light source, the parabolic surface is most efficient in reflecting light and reducing scattered or lost light. Light emitted from light source 212c is reflected into the optical medium along parallel rays of light at the transition surface 402c, thereby reducing light interference at the light sensor 216.

Figure 5:
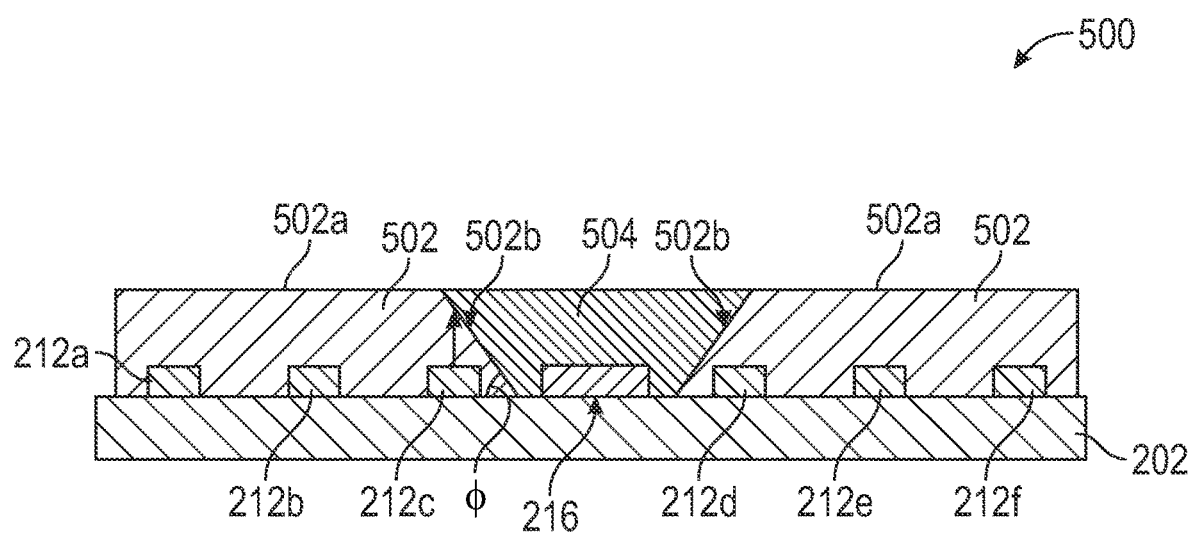
FIG. 5 shows a side cross-sectional view of the electrical circuit, in a second embodiment.

FIG. 5 shows a side cross-sectional view 500 of the electrical circuit 200, in a second embodiment. The side cross-sectional view 500 shows a plurality of light sources 212a-f arranged in a line and a light sensor 216 disposed between light source 212c and light source 212d. A first optical medium 502 is disposed on the substrate 202 and covers the light sources 212a-f, leaving an opening over the light sensor 216. A second optical medium 504 fills the opening and covers the light sensor 216. The first optical medium 502 has a first index of refraction that is greater than a second index of refraction of the second optical medium 504. In another embodiment, the opening is not filled with a second optical medium 504. Stated in another way, the second optical medium is air.

The first optical medium 502 includes a first surface 502a that lies parallel to a plane of the substrate 202 and a second surface 502b that forms sides of the opening. The second surface 502b lies at an angle $\varphi$ to the plane of the substrate 202 ($0°<\varphi<90°$) and intersects the substrate between the light source 212c and the light sensor 216 (or between the light source 212d and the light sensor). Light from light source 212c is incident on the second surface 502b at an incident angle that is greater than a critical angle for total internal reflection of the light. Thus, light from the light source 212c is prevented from causing light interface interference at the light sensor 216.

Figure 6:
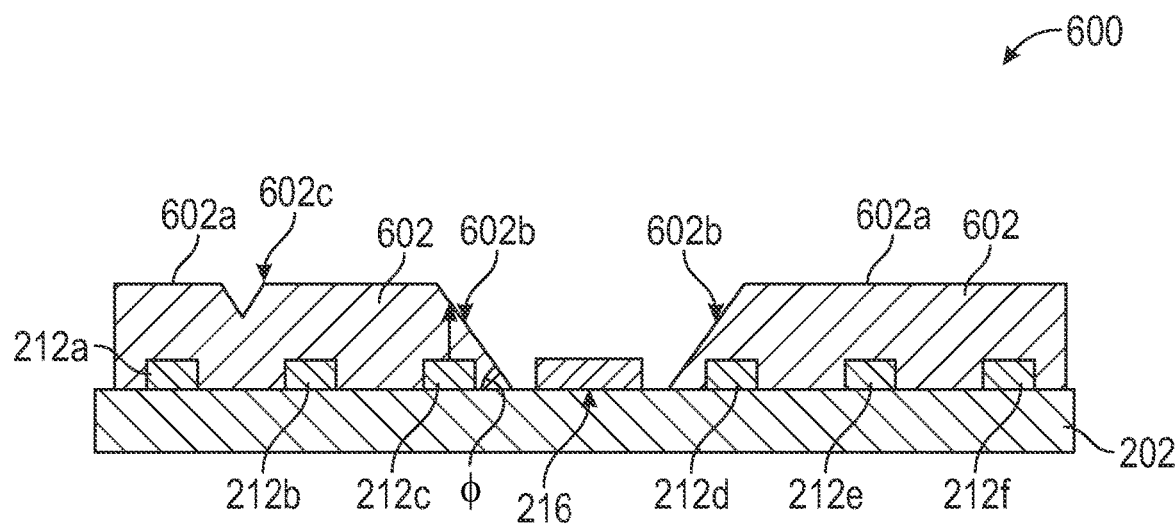
FIG. 6 shows a side cross-sectional view of the electrical circuit, in a third embodiment.

FIG. 6 shows a side cross-sectional view 600 of the electrical circuit 200, in a third embodiment. The side cross-sectional view 600 shows a plurality of light sources 212a-f arranged in a line and a light sensor 216 is disposed between light source 212c and light source 212d. An optical medium 602 is disposed on the substrate 202 and covers the light sources 212a-f.

The optical medium 602 includes a first surface 602a that lies parallel to the substrate 202 and a second surface 602b that lies at an angle φ to the substrate and intersects the substrate between the light source 212c and the light sensor 216 (or between the light source 212d and the light sensor 216), forming an open space above the light sensor. A notch 602c can be formed between any two adjacent light sources (for example, between light source 212a and light source 212b). The notch 602c provides a surface that is oriented such that light from associated light sources (e.g., 212a and 212b) is incident at the surface of the notch at an angle that is greater than a critical angle for total internal reflection. Although only one notch 602c is shown for illustrative purposes, multiple can be formed between the any of the plurality of light sources.

Figure 7:
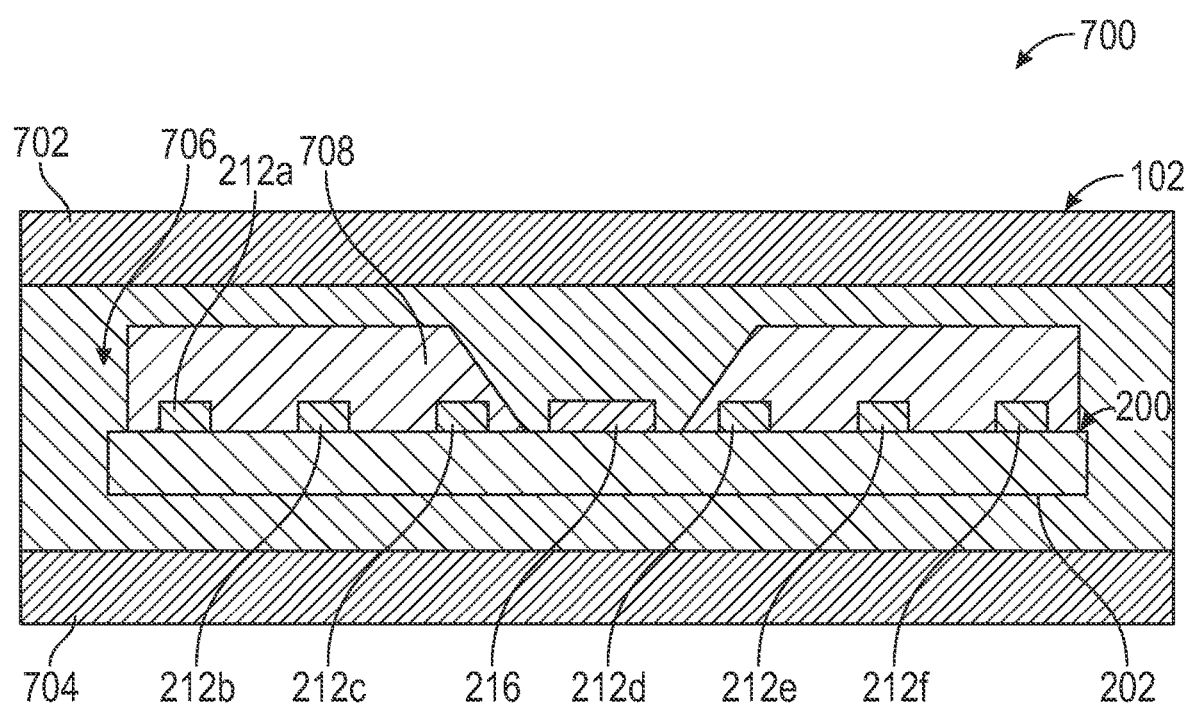
FIG. 7 shows a side cross-sectional view of the window of the vehicle in an exemplary embodiment.

FIG. 7 shows a side cross-sectional view 700 of the window 102 of the vehicle 100 in an exemplary embodiment. The side cross-sectional view 600 shows a first pane 702 and a second pane 704 of the window 102. An optical bonding material 706 is disposed between the first pane 702 and the second pane 704 to bond them together. The electrical circuit 200 is disposed within the optical bonding material 706. The substrate 202 includes the plurality of light sources 212a-f arranged in a line and a light sensor 216 is disposed between light source 212c and light source 212d. An optical medium 708 is disposed on the substrate 202 and covers the light sources 212a-f, leaving an opening over the light sensor 216. The optical bonding material 706 fills the opening and covers the light sensor 216. The optical medium 708 has a first index of refraction that is greater than a second index of refraction of the optical bonding material 706. The optical medium 708 can have a shape such as any of those shown in FIGS. 3-6.

It is noted that the surface of the optical mediums shown in FIGS. 4-7 are highly polished to obtain total internal reflection.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A display, comprising: a substrate; a light source disposed at a first location of the substrate; a light sensor disposed at a second location of the substrate; and a first optical medium disposed on the substrate over the light source, the first optical medium including a surface oriented such that light from the light source is incident at the surface at an angle greater than a critical angle for total internal reflection, thereby preventing light from the light source from passing through the first optical medium and into the light sensor.

2. The display of claim 1, wherein the surface is a curved surface between the first location and the second location within a plane that is perpendicular to the substrate and includes the first location and the second location.

3. The display of claim 2, wherein the surface is in a shape of a parabola and a focus of the parabola is located at the first location.

4. The display of claim 1, further comprising an opening in the first optical medium above the light sensor, wherein a second optical medium fills the opening and is in contact with the first optical medium, wherein a first index of refraction of the first optical medium is greater than a second index of refraction of the second optical medium.

5. The display of claim 4, wherein the second optical medium is air.

6. The display of claim 1, wherein the surface is parallel to the substrate, further comprising a notch in the surface disposed at a location between the light source and an adjacent light source.

7. A window for a vehicle, comprising a display comprising: a substrate; a light source disposed at a first location of the substrate; a light sensor disposed at a second location of the substrate; and a first optical medium disposed on the substrate over the light source, the first optical medium including a surface oriented such that light from the light source is incident at the surface at an angle greater than a critical angle for total internal reflection, thereby preventing light from the light source from passing through the first optical medium and into the light sensor.

8. The window of claim 7, wherein the surface is a curved surface between the first location and the second location within a plane that is perpendicular to the substrate and includes the first location and the second location.

9. The window of claim 8, wherein the surface is in a shape of a parabola and a focus of the parabola is located at the first location.

10. The window of claim 7, further comprising an opening in the first optical medium above the light sensor, wherein a second optical medium fills the opening and is in contact with the first optical medium, wherein a first index of refraction of the first optical medium is greater than a second index of refraction of the second optical medium.

11. The window of claim 10, wherein the second optical medium is an optical bonding material that bonds a first pane of the window to a second pane of the window.

12. The window of claim 10, wherein the second optical medium is air.

13. The window of claim 7, wherein the surface is parallel to the substrate, further comprising a notch in the surface disposed at a location between the light source and an adjacent light source.

14. A vehicle, comprising: a window having a display, the display comprising: a substrate; a light source disposed at a first location of the substrate; a light sensor disposed at a second location of the substrate; and a first optical medium disposed on the substrate over the light source, the first optical medium including a surface oriented such that light from the light source is incident at the surface at an angle greater than a critical angle for total internal reflection, thereby preventing light from the light source from passing through the first optical medium and into the light sensor.

15. The vehicle of claim 14, wherein the surface is a curved surface between the first location and the second location within a plane that is perpendicular to the substrate and includes the first location and the second location.

16. The vehicle of claim 15, wherein the surface is in a shape of a parabola and a focus of the parabola is located at the first location.

17. The vehicle of claim 14, further comprising an opening in the first optical medium above the light sensor, wherein a second optical medium fills the opening and is in contact with the first optical medium, wherein a first index of refraction of the first optical medium is greater than a second index of refraction of the second optical medium.

18. The vehicle of claim 17, wherein the second optical medium is an optical bonding material that bonds a first pane of the window to a second pane of the window.

19. The vehicle of claim 17, wherein the second optical medium is air.

20. The vehicle of claim 14, wherein the surface is parallel to the substrate, further comprising a notch in the surface disposed at a location between the light source and an adjacent light source.

\* \* \* \* \*